United States Patent
Mizrahi et al.

(10) Patent No.: US 10,243,857 B1
(45) Date of Patent: Mar. 26, 2019

(54) METHOD AND APPARATUS FOR MULTIPATH GROUP UPDATES

(71) Applicant: Marvell Israel (M.I.S.L) Ltd., Yokneam (IL)

(72) Inventors: Tal Mizrahi, Haifa (IL); Carmi Arad, Nofit (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

(21) Appl. No.: 15/701,151

(22) Filed: Sep. 11, 2017

Related U.S. Application Data

(60) Provisional application No. 62/385,651, filed on Sep. 9, 2016.

(51) Int. Cl.
| | |
|---|---|
| H04L 12/803 | (2013.01) |
| H04L 12/707 | (2013.01) |
| H04L 29/06 | (2006.01) |
| H04L 12/743 | (2013.01) |
| H04L 12/721 | (2013.01) |

(52) U.S. Cl.
CPC ............ H04L 47/125 (2013.01); H04L 45/24 (2013.01); H04L 45/70 (2013.01); H04L 45/7453 (2013.01); H04L 69/22 (2013.01)

(58) Field of Classification Search
None
See application file for complete search history.

(56) References Cited

U.S. PATENT DOCUMENTS

| | | |
|---|---|---|
| 5,032,987 A | 7/1991 | Broder et al. |
| 6,035,107 A | 3/2000 | Kuehlmann et al. |
| 6,249,521 B1 | 6/2001 | Kerstein |
| 6,363,396 B1 | 3/2002 | Klots et al. |
| 6,430,170 B1 | 8/2002 | Saints et al. |
| 6,614,758 B2 | 9/2003 | Wong et al. |
| 6,735,670 B1 | 5/2004 | Bronstein et al. |
| 6,757,742 B1 | 6/2004 | Viswanath |
| 6,973,082 B2 | 12/2005 | Devi et al. |

(Continued)

FOREIGN PATENT DOCUMENTS

WO   WO-2013-017017 A1   2/2013

OTHER PUBLICATIONS

U.S. Appl. No. 14/657,898, filed Mar. 13, 2015.

(Continued)

*Primary Examiner* — Rebecca E Song

(57) ABSTRACT

A method for updating multipath groups of a network device is described. A first table defining a first multipath group of multiple egress interfaces is created. A change in network path availability at one or more egress interface members of the first multipath group is identified. The first multipath group includes at least some egress interfaces that remain available and that support at least some active packet sessions. A second table defining a second multipath group is created and coexists with the first multipath group. The second multipath group includes the remaining network paths that remain available. The first multipath group and the first table are selected for forwarding a packet from the active packet sessions. The second multipath group and the second table are selected for forwarding a packet from new packet sessions that are established after the change in the path availability.

21 Claims, 9 Drawing Sheets

(56) References Cited

U.S. PATENT DOCUMENTS

| | | |
|---|---|---|
| 7,190,696 B1 | 3/2007 | Manur et al. |
| 7,224,845 B1 | 5/2007 | Russo et al. |
| 7,280,527 B2 | 10/2007 | Basso et al. |
| 7,346,706 B2 | 3/2008 | Rezaaifar et al. |
| 7,424,016 B2 | 9/2008 | Sweeney et al. |
| 7,539,750 B1 | 5/2009 | Parker et al. |
| 7,554,914 B1 | 6/2009 | Li et al. |
| 7,567,567 B2 | 7/2009 | Muller et al. |
| 7,580,417 B2 | 8/2009 | Ervin et al. |
| 7,613,209 B1 | 11/2009 | Nguyen et al. |
| 7,623,455 B2 | 11/2009 | Hilla et al. |
| 7,639,614 B2 | 12/2009 | Nakagawa et al. |
| 7,796,594 B2 | 9/2010 | Melman et al. |
| 7,821,925 B2 | 10/2010 | Davies |
| 7,821,931 B2 | 10/2010 | Swenson et al. |
| 7,898,959 B1 | 3/2011 | Arad |
| 7,969,880 B2 | 6/2011 | Yano et al. |
| 7,979,671 B2 | 7/2011 | Aviles |
| 8,004,990 B1 | 8/2011 | Callon |
| 8,090,805 B1 | 1/2012 | Chawla et al. |
| 8,175,107 B1 | 5/2012 | Yalagandula et al. |
| 8,238,250 B2 | 8/2012 | Fung |
| 8,243,594 B1 | 8/2012 | Fotedar et al. |
| 8,244,909 B1 | 8/2012 | Hanson et al. |
| 8,259,585 B1 | 9/2012 | S P et al. |
| 8,274,971 B2 | 9/2012 | Battle et al. |
| 8,339,951 B2 | 12/2012 | Scaglione |
| 8,355,328 B2 | 1/2013 | Matthews et al. |
| 8,364,711 B2 | 1/2013 | Wilkins et al. |
| 8,503,456 B2 | 8/2013 | Matthews et al. |
| 8,587,674 B2 | 11/2013 | Iwata |
| 8,614,950 B2 | 12/2013 | Roitshtein et al. |
| 8,625,594 B2 | 1/2014 | Safrai et al. |
| 8,660,005 B2 | 2/2014 | Roitshtein et al. |
| 8,756,424 B2 | 6/2014 | Roitshtein et al. |
| 8,792,497 B2 | 7/2014 | Rajagopalan et al. |
| 8,848,728 B1 | 9/2014 | Revah et al. |
| 9,171,030 B1 | 10/2015 | Arad et al. |
| 9,237,100 B1 | 1/2016 | Mizrahi et al. |
| 9,590,910 B1 | 3/2017 | Pannell |
| 2002/0093952 A1 | 7/2002 | Gonda |
| 2003/0043825 A1 | 3/2003 | Magnussen et al. |
| 2003/0147385 A1 | 8/2003 | Montalvo et al. |
| 2003/0188018 A1 | 10/2003 | Guerrero et al. |
| 2003/0210688 A1 | 11/2003 | Basso et al. |
| 2003/0235168 A1 | 12/2003 | Sharma et al. |
| 2004/0073640 A1 | 4/2004 | Martin et al. |
| 2005/0198297 A1 | 9/2005 | Tzeng |
| 2005/0213582 A1 | 9/2005 | Wakumoto et al. |
| 2006/0193333 A1 | 8/2006 | Baughan et al. |
| 2006/0251109 A1 | 11/2006 | Muller et al. |
| 2007/0280258 A1 | 12/2007 | Rajagopalan et al. |
| 2007/0282748 A1 | 12/2007 | Saint Clair et al. |
| 2008/0031263 A1 | 2/2008 | Ervin et al. |
| 2008/0037544 A1 | 2/2008 | Yano et al. |
| 2008/0049774 A1 | 2/2008 | Swenson et al. |
| 2008/0052488 A1 | 2/2008 | Fritz et al. |
| 2008/0069114 A1 | 3/2008 | Shimada |
| 2008/0084881 A1 | 4/2008 | Dharwadkar et al. |
| 2008/0181103 A1 | 7/2008 | Davies |
| 2008/0205655 A1 | 8/2008 | Wilkins et al. |
| 2009/0196303 A1 | 8/2009 | Battle et al. |
| 2009/0274154 A1 | 11/2009 | Kopelman et al. |
| 2010/0023726 A1 | 1/2010 | Aviles |
| 2010/0142410 A1 | 6/2010 | Huynh Van et al. |
| 2010/0214913 A1 | 8/2010 | Kompella |
| 2010/0284404 A1 | 11/2010 | Gopinath et al. |
| 2011/0013627 A1 | 1/2011 | Matthews et al. |
| 2011/0013638 A1 | 1/2011 | Matthews et al. |
| 2011/0013639 A1 | 1/2011 | Matthews et al. |
| 2011/0102612 A1 | 5/2011 | Iwata |
| 2011/0134925 A1 | 6/2011 | Safrai et al. |
| 2011/0295894 A1 | 12/2011 | Yoo |
| 2011/0296411 A1 | 12/2011 | Tang et al. |
| 2012/0136846 A1 | 5/2012 | Song et al. |
| 2013/0013880 A1 | 1/2013 | Tashiro et al. |
| 2013/0024541 A1 | 1/2013 | Ziegler et al. |
| 2013/0242985 A1 | 9/2013 | Basso et al. |
| 2014/0093073 A1 | 4/2014 | Horgan et al. |
| 2014/0115167 A1 | 4/2014 | Roitshtein et al. |
| 2014/0119193 A1 | 5/2014 | Anand et al. |
| 2014/0160934 A1 | 6/2014 | Roitshtein et al. |
| 2014/0173129 A1 | 6/2014 | Basso et al. |
| 2014/0301394 A1 | 10/2014 | Arad et al. |
| 2014/0325228 A1 | 10/2014 | Roitshtein et al. |
| 2015/0046085 A1* | 2/2015 | Gornisiewicz ..... G01C 21/3415 701/519 |
| 2015/0334057 A1 | 11/2015 | Gao et al. |
| 2016/0261500 A1 | 9/2016 | Revah et al. |

OTHER PUBLICATIONS

Thaler et al., "Multipath Issues in Unicast and Multicast Next-Hop Selection," The Internet Society, 2000, 10 pages.

Raoof et al., Impact of Depolarization Effects on MIMO Polarized Wireless Configuration, Wireless Communications, Networking and Mobile Computing, 2007. WiCom 2007, Sep. 21-25, 2007, pp. 1-4.

IEEE Std 802.1Q, 2003 Edition, "IEEE Standards for Local and Metropolitan area networks—Virtual Bridged Local Area Networks," *The Institute of Electrical and Electronics Engineers, Inc.*, 327 pages (May 7, 2003).

IEEE Std 802.1Q-2011 (Revision of IEEE Std.802.1Q-2005), "IEEE Standard for Local and Metropolitan Area Networks—Media Access Control (MAC) Bridges and Virtual Bridged Local Area Networks," The Institute of Electrical and Electronics Engineers, Inc., 1,365 pages (Aug. 31, 2011).

IEEE P802.1aq/D4.6, Draft Amendment to IEEE Std 802.1Q-2011, "IEEE Draft Standard for Local and Metropolitan Area Networks—Media Access Control (MAC) Bridges and Virtual Bridged Local Area Networks—Amendment XX: Shortest Path Bridging," *The Institute of Electrical and Electronics Engineers, Inc.*, 363 pages (Feb. 10, 2012).

IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, 60 pages, (Aug. 17, 2005).

Demetriades et al., "An Efficient Hardware-based Multi-hash Scheme for High Speed IP Lookup," 2008 16th IEEE Symposium on High Performance Interconnects, Aug. 2008 (8 pages).

Herlihy et al., "Hopscotch Hashing," *DISC '08 Proceedings of the 22nd International Symposium on Distributed Computing*, pp. 350-364 (Sep. 22, 2008).

"Hopscotch Hashing," *Wikipedia* entry downloaded from http://en.wikipedia.org/wiki/Hopscotch_hashing on Oct. 6, 2014 (3 pages).

Peng et al., "Content-Addressable memory (CAM) and its network applications," International IC—Taipei Conference Proceedings, May 2000.

Shavit, "Hopscotch Hashing," PowerPoint Presentation downloaded from http://www.velox-project.eu/sites/default/files/Hopscotch%20Hashing%20talk%20slides.ppt on Oct. 6, 2014 (50 slides).

U.S. Appl. No. 61/695,520, "Efficient TCAM Architecture," filed Aug. 31, 2012 (Levi, et al.).

* cited by examiner

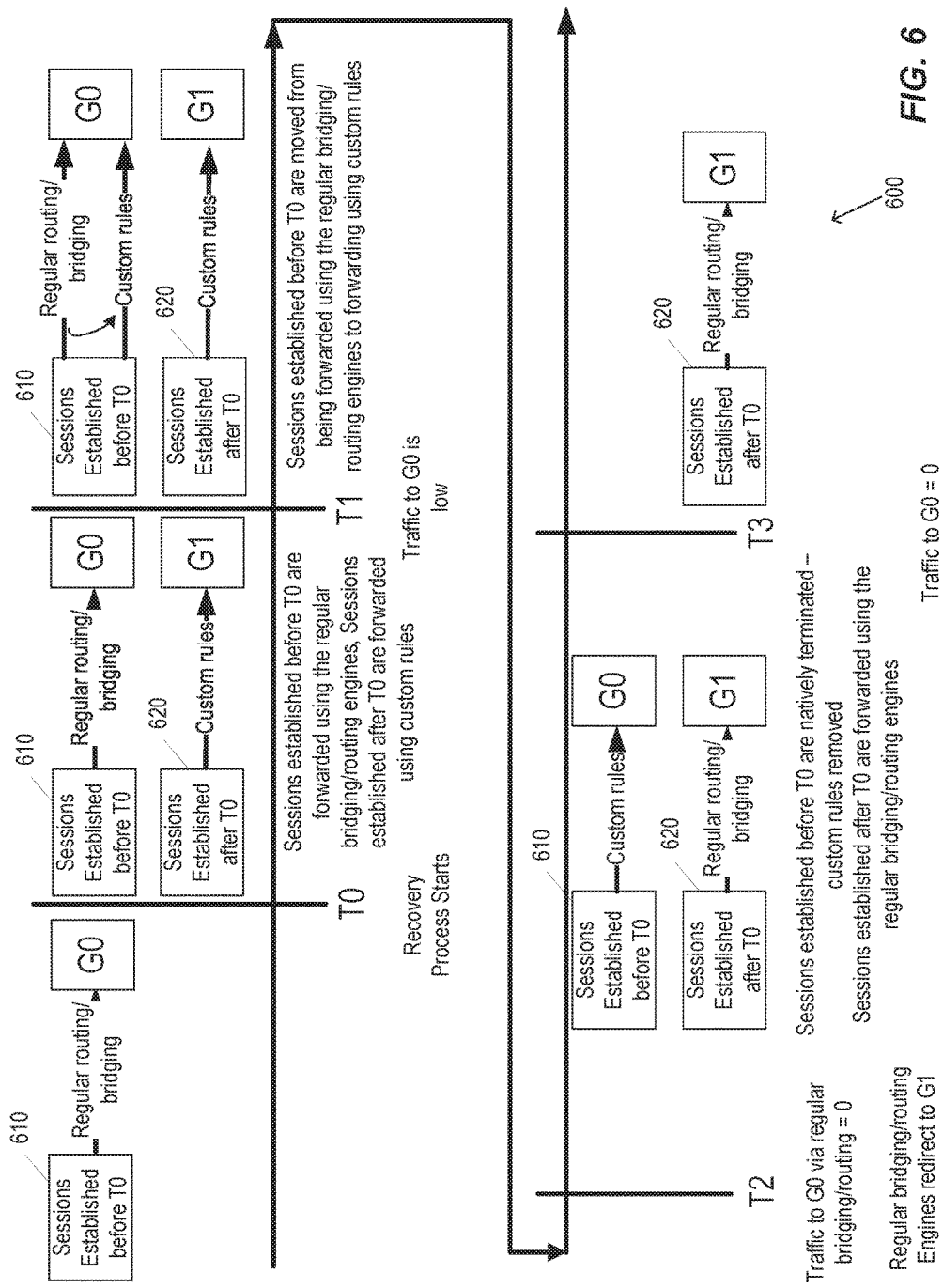

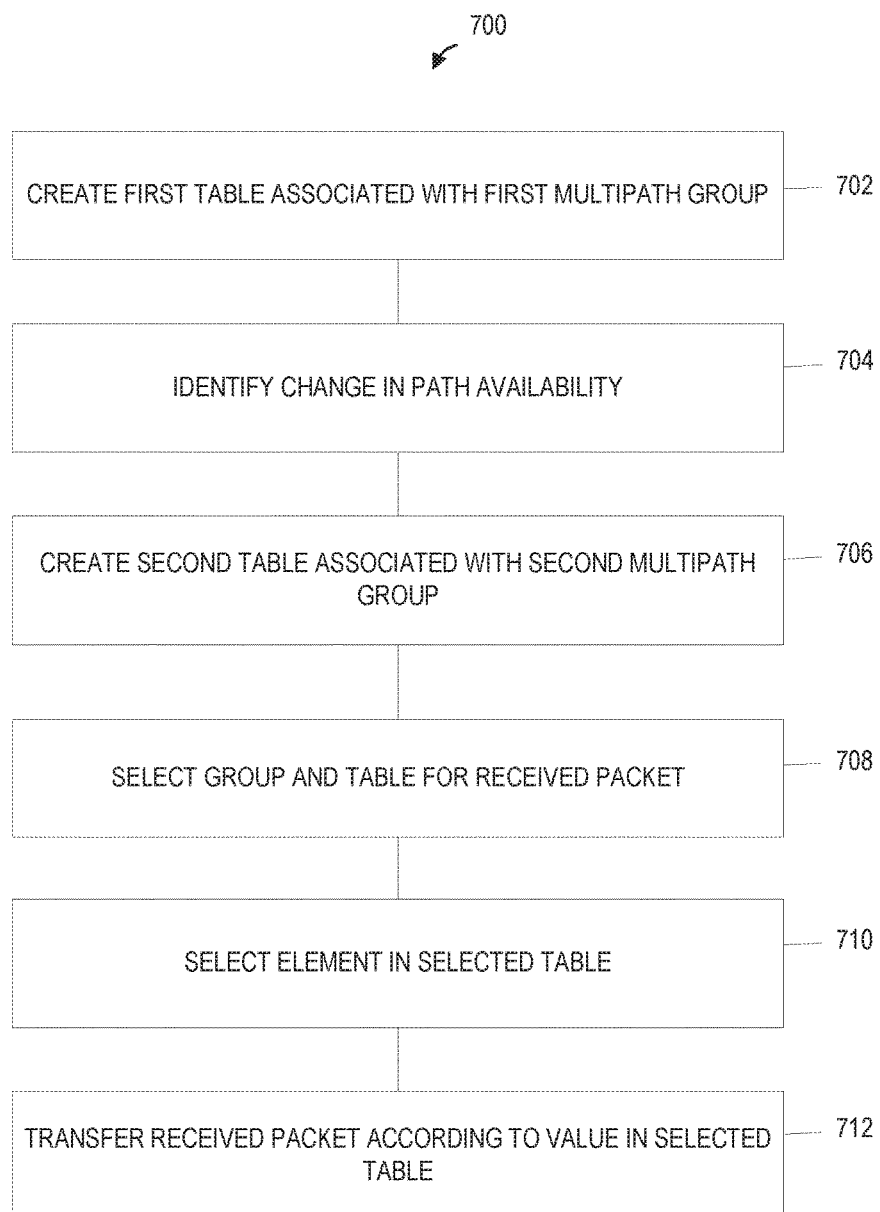

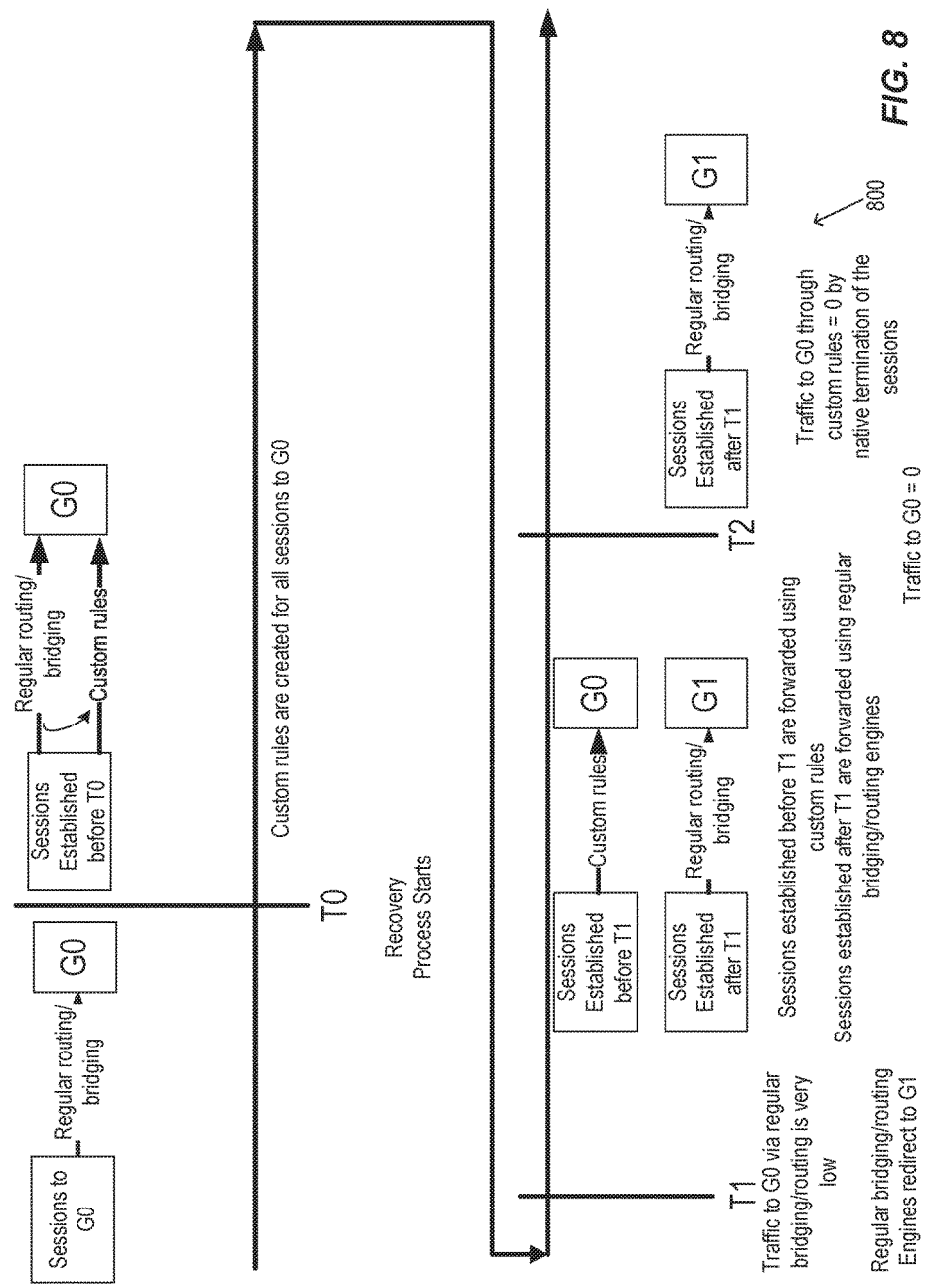

METHOD AND APPARATUS FOR MULTIPATH GROUP UPDATES

CROSS-REFERENCE TO RELATED APPLICATION

This application that claims the benefit of U.S. Provisional Patent Application No. 62/385,651, entitled "Apparatus for Resilient Load Balancing," filed on Sep. 9, 2016, the disclosure of which is hereby expressly incorporated herein by reference in its entirety.

FIELD OF THE DISCLOSURE

The present disclosure relates generally to communication systems and, more particularly, to using multiple multipath groups to select network interfaces in a group of network interfaces.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, hash functions are widely used in a variety of computing applications to map data in a larger set to a value in a smaller set. For example, a relatively long sequence of bits may be supplied as an input into a mathematical function to generate a shorter sequence of bits that serves as an index into a database table.

One area of application in which hashing can be particularly useful is network switching. In general, a network switch may receive and transmit data packets via multiple ports. In some situations, there may be more than one possible network link via which a packet can be transmitted to properly forward the data packet to its destination. Moreover, network links sometimes are purposefully aggregated to provide more bandwidth between communicating devices or networks. Grouping links together to define wider communication channels in the context of Layer-2 networking is sometimes referred to as link aggregation (LAG, sometimes referred to as a "trunk"). In the context of Layer-3 networking, a routing technique typically referred to as equal-cost multi-path (ECMP) routing is utilized in situations where multiple paths present equally attractive routing choices to a network switch. Another Layer-2 or Layer-3 network routing technique, referred to as weighted-cost multipath (WCMP) routing, may be utilized when different paths in a group exhibit unequal throughput rates.

A hash function is sometimes used to select one of the links or paths in a group of links/paths (e.g., a LAG group, an ECMP group, a WCMP group, a group of links/paths in a switch fabric, etc.) to transmit a packet. For example, the hash function can be applied to a portion or portions of a header of the packet, and a result of the hash function then indicates one of the links/paths in the group of links/paths via which the packet is to be transmitted.

SUMMARY OF THE DISCLOSURE

In an embodiment, a method for updating multipath groups of a network device includes: creating, at the network device, a first table defining a first multipath group of multiple egress interfaces, wherein elements in the first table include values indicating individual egress interfaces that are members of the first multipath group; identifying, at the network device, a change in network path availability at one or more egress interface members of the first multipath group, the first multipath group including at least some egress interfaces that remain available for network communication after the change in the network path availability and that support at least some active packet sessions via the remaining network paths after the change in the network path availability; creating, at the network device and in response to the change in the network path availability, a second table defining a second multipath group of multiple egress interfaces, wherein i) elements in the second table include values indicating individual egress interfaces that are members of the second multipath group, ii) the second multipath group coexists with the first multipath group, and iii) the second multipath group includes the remaining network paths of the first multipath group that remain available after the change in the network path availability, and selecting, at the network device, the first multipath group and the first table for forwarding a packet when the packet is from the active packet sessions and the second multipath group and the second table for forwarding the packet when the packet is from new packet sessions that are established after the change in the path availability.

In another embodiment, a network device includes a plurality of egress interfaces configured to transmit packets, a forwarding manager configured to select one or more multipath groups of multiple egress interfaces for forwarding packets received by the network device, and a multipath egress interface selector configured to select individual egress interfaces within the one or more multipath groups selected by the forwarding manager. The multipath egress interface selector is configured to create a first table defining a first multipath group of multiple egress interfaces, wherein elements in the first table include values indicating individual egress interfaces that are members of the first multipath group, identify a change in network path availability at one or more egress interface members of the first multipath group, the first multipath group including at least some egress interfaces that remain available for network communication after the change in the network path availability and that support at least some active packet sessions via the remaining network paths after the change in the network path availability, create, in response to the change in the network path availability, a second table defining a second multipath group of multiple egress interfaces, wherein i) elements in the second table include values indicating individual egress interfaces that are members of the second multipath group, ii) the second multipath group coexists with the first multipath group, and iii) the second multipath group includes the remaining network paths of the first multipath group that remain available after the change in the network path availability, and select the first multipath group and the first table for forwarding a packet when the packet is from the active packet sessions and the second multipath group and the second table for forwarding the packet when the packet is from new packet sessions that are established after the change in the path availability.

BRIEF DESCRIPTION OF THE DRAWINGS

FIG. 6 is a diagram of an example timeline for updating multipath groups based on a change in path availability, according to an embodiment.

FIG. 7 is a flow diagram of an example method for updating multipath groups of a network device that is implemented by one or more of the network devices of FIG. 1 and/or by the example egress interface selector of FIG. 2A, according to an embodiment.

FIG. 8 is a diagram of an example timeline for updating multipath groups based on a change in path availability, according to another embodiment.

DETAILED DESCRIPTION

Embodiments are described herein in the context of selecting an egress interface from a group of egress interfaces. As used herein, the term "egress interface" refers to a network interface via which a packet is to be transmitted by a network device. According to various embodiments, examples of egress interfaces include physical ports, logical ports, logical network interfaces, end-to-end network paths, paths through switch fabrics, etc. As used herein, a multipath group of egress interfaces is a group of egress interfaces of the network device for routing a packet to a network destination or anycast destination. Anycast addressing is a one-to-one-of-many association where packets are routed to any single member of a group of potential receivers that are all identified by a same destination address (i.e., anycast destination). An anycast routing algorithm selects the single member from the group based on which member has a lowest cost, in some embodiments. In some scenarios, members of the multipath group respectively have a same "cost" for routing a packet to a network destination or anycast destination. In other scenarios, members of the multipath group have different costs (e.g., a weighted cost network).

When the egress interfaces of a multipath group have changed (e.g., an egress interface has been added, removed, or both), subsequent packets forwarded to the network destination may be forwarded via a different egress interface of the multipath group, for example, due to removal of a prior egress interface or to achieve load balancing across an additional egress interface, in various embodiments and/or scenarios. The addition or removal of an egress interface alters the existing load balancing of traffic among interfaces that are members of the multipath group, which potentially results in congestion or underutilization of one or more members of the multipath group. In the embodiments described herein, a network device transitions between different first and second multipath groups for the network destination so that active packet sessions are not disrupted (e.g., without causing significant out of order packet delivery or terminated packet sessions). In an embodiment, when an egress interface of a multipath group is added or removed (e.g., a "network topology change event"), the network device continues to use a legacy forwarding table for active sessions, but builds and uses a new forwarding table for new sessions, where "active sessions" refers to sessions established before the network topology event and "new sessions" refers to sessions established after the network topology event. The network device uses the legacy forwarding table for a transition period, which allows the active sessions to terminate naturally, after which the legacy forwarding table is deactivated.

Figure 1:
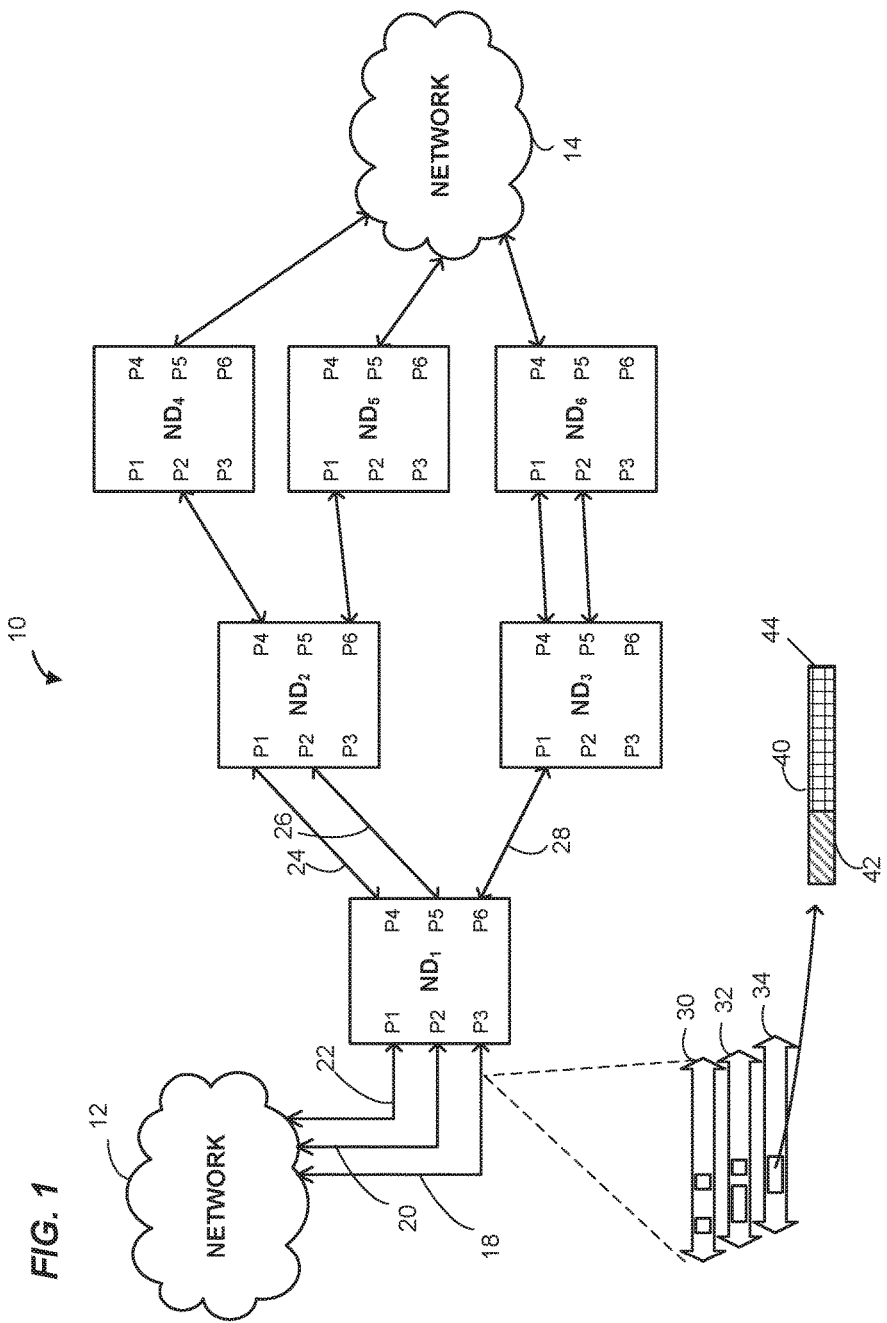
FIG. 1 is a block diagram of a communication network in which network devices apply network interface selection techniques discussed herein, according to an embodiment.

FIG. 1 is a block diagram of an example communication network 10 in which several network devices $ND_1$, $ND_2$, ..., $ND_6$ process sessions between a first endpoint (e.g., an external network 12) and a second endpoint (e.g., an internal network 14), according to an embodiment. In various embodiments and/or scenarios, the endpoints are packet sources or sinks, such as a computer or network. As used herein, a session is an exchange of information between two processes running on two different network endpoints, for example, a source process and a destination process that exchange packets or data units. The network generally delivers the information from the source process to the destination process in the order that it has been transmitted by the source process. In some embodiments, the session is a transmission control protocol session. In some embodiments, the network 10 load-balances across multiple network paths.

Figure 2A:
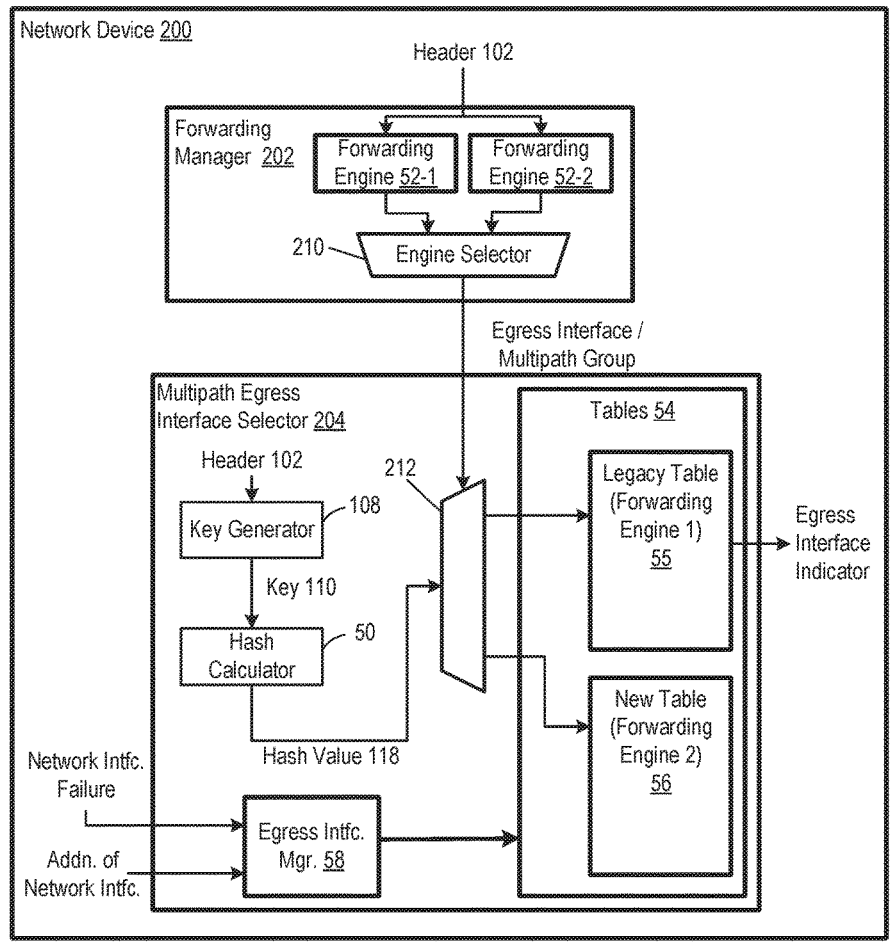
FIG. 2A is a block diagram of an example network device of FIG. 1, according to an embodiment.

The network devices $ND_1$-$ND_6$ may be of the same or different types of network devices, and include workgroup switches, other types of switches, routers, or any other suitable network devices having data processing capability, in various embodiments. An embodiment of the network devices $ND_1$-$ND_6$ is shown in FIG. 2A (network device 200). Each of the network devices $ND_1$-$ND_6$ is configured to determine via which network interfaces of the network device packets are to be egressed. In some embodiments, respective forwarding engines determine via which network interfaces of the network device packets are to be egressed.

FIG. 2A is a block diagram of an example network device 200, according to an embodiment. The network device 200 performs packet forwarding decisions using one or more bridging/routing protocols, in various embodiments. In some scenarios, the forwarding decision results in an egress interface of the network device or a multipath group. When the forwarding decision results in a multipath group, then the network device 200 determines an egress interface from among members of the multipath group. In the embodiment shown in FIG. 2A, the network device 200 includes a forwarding manager 202 that performs packet forwarding decisions and a multipath egress interface selector 204 that implements egress interface selection techniques discussed below, in an embodiment.

In various embodiments, the forwarding manager includes one or more forwarding engines 52 that perform the packet forwarding decisions based on at least a portion of a packet header. In an embodiment, the forwarding manager 202 includes an engine selector 210 that selects between multiple forwarding engines 52. In the embodiment shown in FIG. 2A, the forwarding engines 52 include a default forwarding engine 52-1 (e.g., or "regular forwarding engine" for regular routing and bridging rules) and a policy-based forwarding engine 52-2. In an embodiment, the policy-based forwarding engine 52-2 is configurable to perform egress interface selection for a particular session, for example, using custom routing rules. The forwarding manager 202 generates custom rules, in an embodiment. In some embodiments, the engine selector 210 prioritizes the policy-based forwarding engine 52-2 over the default forwarding engine 52-1, for example, by selecting the default forwarding engine 52-1 only when the policy-based forwarding engine 52-2 has not provided a forwarding decision. The forwarding engines 52 provide either an egress interface indicator or a multipath group. The multipath egress interface selector 204 determines an egress interface indicator from the multipath group, as described below.

In operation, the network device $ND_1$ receives data units (such as packets or frames (hereinafter referred to as "packets" merely for ease of explanation and brevity)) traveling from the external network 12 to the internal communication network 14 via communication links 18, 20, and 22 at respective ports P1, P2, and P3 (generally referred to herein as "ingress ports" or "source ports" PR). The forwarding manager 202 determines (e.g., by analyzing headers in the packets) that certain packets are to be egressed by a group of ports P4, P5, and P6. Thus, the network device $ND_1$ forwards the certain packets to the network devices $ND_2$ or $ND_3$ via the corresponding ports P4, P5, and P6 (generally referred to herein as "egress ports" or "target ports" PT) and, ultimately, respective communication links 24, 26, and 28. The ports P1-P6 are examples of network interfaces, according to some embodiments.

The routing configuration of the load-balancing network 10, in some scenarios, is such that the network device $ND_1$ selects one of the ports of P4, P5, or P6 to properly direct a data packet toward its destination in the internal network 14. In order to increase bandwidth to the destination, the communication links 24, 26, and 28 are treated as a single logical link, and the network device $ND_1$ applies load-balancing techniques to distribute the received packets among the appropriate ones of the links 24, 26, and 28, according to some embodiments. For example, the network device $ND_1$ selects ones of the ports P4, P5, P6 corresponding to ones of the links 24, 26, and 28. To this end, the network device $ND_1$ utilizes the multipath egress interface selector 204 to select one of the ports P4, P5, P6, in an embodiment. For example, in an embodiment, the multipath egress interface selector 204 uses a hash function to generate a hash value, and uses the hash value to select one of the ports P4, P5, P6 via which a packet is to be egressed, in an embodiment. In some embodiments, one or more of the multipath egress interface selectors 204 also utilize load-balancing techniques such as described in U.S. Pat. No. 8,756,424 to distribute transmission of packets across multiple network paths. In other embodiments, one or more of the multipath egress interface selectors 204 utilize other suitable load-balancing techniques to distribute transmission of packets across multiple network paths.

Although FIG. 1 illustrates a particular embodiment of the network devices $ND_1$-$ND_6$, each of these the network devices $ND_1$-$ND_6$ includes any suitable number of ports, and at least some of the network devices $ND_1$-$ND_6$ have different numbers of ports. In some embodiments, configurations, and/or scenarios, some or all of the network devices $ND_1$-$ND_6$ perform protocol translation for some of the packets by removing and/or adding protocol headers at one or several protocol layers of a corresponding communication protocol stack.

The links 18, 20, 22 correspond to different physical communication channels such as network cables, wireless bands, etc., or logical channels such as timeslots of a digital signal 1 (DS1) line, to take one example, in various embodiments. Similarly, ports P1, P2, P3 correspond to physical or logical resources of the network device $ND_1$, in various embodiments.

As illustrated in FIG. 1, the link 18 carries one or more sessions 30, 32, 34. A session includes packets that have a same source address, a same destination address, and a same packet type. Typically but not necessarily, each of the sessions 30, 32, 34 is a bidirectional flow including packets traveling from the network 12 to the network 14, or inbound data, and packets traveling to the network 12 from the network 14, or outbound data. The links 20 and 22 also carry one or several sessions, in an embodiment.

In some embodiments and/or scenarios, the sessions 30, 32, 34 are associated with different communication protocols such as Transmission Control Protocol (TCP) layered over Internet Protocol (IP) (hereinafter, "TCP/IP"), User Datagram Protocol (UDP) layered over IP (hereinafter, "UDP/IP"), File Transfer Protocol (FTP), Hypertext Transfer Protocol (HTTP), etc. For example, the session 30 corresponds to FTP, the session 32 corresponds to Telnet, and the session 34 corresponds to HTTP, in one scenario. Further, some of the sessions 30-34 correspond to different sessions associated with the same communication protocol, in some scenarios. A typical network link also includes Simple Mail Transfer Protocol (SMTP), Structured Query Language (SQL), and several additional sessions associated with e-mailing, web browsing, database applications, remote login, and other application types.

With continued reference to FIGS. 1 and 2A, an example data packet 40 in the session 34 includes a header 42 and a payload 44. In general, the header 42 corresponds to one or more layers of a protocol stack which indicates how the packet is to be processed at the corresponding endpoints. The forwarding engine 52 is configured to analyze at least a portion of the header 42 to determine via which port or ports the packet 40 should be egressed. For example, in some embodiments, the forwarding engine 52 uses a portion of the header 42, such as a destination address, media access control address, traffic class, or other suitable portion of the header 42 to look up in a forwarding database (not shown) an indication of a port or ports via which the packet 40 is to be egressed. In some embodiments, the indication of the port or ports via which the packet 40 is to be egressed is an indication of a LAG, and the multipath egress interface selector 204 selects one of the ports within the group. More generally, in some embodiments, the forwarding engine 52 identifies a group of network interfaces such as a link aggregation group (LAG) group, a group of links, an equal cost multipath (ECMP) group, a weighted cost multipath (WCMP) group, a group of paths through a switch fabric, etc., and the multipath egress interface selector 204 selects one of the ports/links/paths within the group.

In some embodiments, when the forwarding engine 52 identifies a group of ports (e.g., the group P4, P5, P6 of network device $ND_1$) for a packet, the multipath egress interface selector 204 selects one of the ports P4, P5, P6 using a hash function, according to an embodiment. For example, the multipath egress interface selector 204 includes a hash calculator 50 that is configured to calculate a hash output using i) one or more fields of a header of a packet, and ii) a hash function, in an embodiment. The hash output is then used as an index into one or more forwarding tables 54 that are used for making forwarding decisions, where each forwarding table is associated with the group of ports identified by the forwarding engine 52 for egressing the packet, in an embodiment. The entries of each of the one or more tables 54 include indications of particular ports among the multipath group of ports, in an embodiment. The table entry indexed by the hash output indicates a particular port via which the packet is to be transmitted, in an embodiment. The tables 54 are stored in a memory device, and different entries in the tables 54 correspond to different memory locations in the memory device, according to an embodiment. In an embodiment, the hash output specifies an address in the memory device.

In various embodiments, multiple tables of the tables 54 are associated with a single multipath group of ports identified by the forwarding manager 202 for egressing the packet. In an embodiment, for example, the forwarding manager 202 identifies a first forwarding table 55 associated with the group of ports for a first packet and identifies a second forwarding table 56 associated with the group of ports for a second packet, as described below. In an embodiment, for example, the first packet is part of a new session, the second packet is part of an active session, and i) the default forwarding engine 52-1 identifies the first multipath group for the first packet and the policy-based forwarding engine 52-2 does not provide a forwarding decision for the first packet (i.e., no policy has been set that matches the packet), and ii) the default forwarding engine 52-1 identifies the first multipath group for the second packet and the policy-based forwarding engine 52-2 identifies the second multipath group for the second packet (where the engine selector 210 prioritizes the policy-based forwarding engine 52-2 and provides the second multipath group to the multipath egress interface selector 204).

The multipath egress interface selector 204 includes an egress interface manager 58, in an embodiment. The egress interface manager 58 is configured to manage the tables 54 associated with the group of ports. For instance, in some embodiments, when a current one of the ports in the group becomes inoperable, the egress interface manager 58 modifies the tables 54 so that i) first packet sessions that were being transmitted via the one port are switched to one or more remaining ports in the group, and ii) second packet sessions that were already being transmitted via the remaining ports do not switch ports. For example, according to an embodiment, in response to a current one of the ports in the group becoming inoperable, the egress interface manager 58 searches the table 55 for entries with a value corresponding to the one port, and replaces the value in those entries with one or more other values corresponding to one or more other ports in the group.

A port is considered inoperable when, for example, the port itself or a corresponding network link coupled to the port cannot be used, in some embodiments. For example, in various embodiments, a port cannot be used if the port itself fails, a corresponding network link coupled to the port fails, etc. As discussed above, ports are examples of network interfaces. In other embodiments, a network interface corresponds to virtual port, or another suitable interface.

Selection of a port or group of ports by the forwarding engine 52 is merely an example of selecting a network interface or group of network interfaces via which a packet is to be transmitted by the network device, i.e., an egress interface. In some embodiments, other examples of egress interfaces include logical ports, logical network interfaces, end-to-end paths in a network, paths through a switch fabric, etc.

The multipath egress interface selector 204 is configured to receive at least a portion 102 of a header of a packet (for ease of explanation and brevity, the term "at least the portion 102 of the header" will be referred to as "the header 102"), according to an embodiment. A key generator 108 generates a key 110 based on the header 102. For example, in an embodiment, the key generator 108 is configured to generate the key based on one or more portions of the header 102, such as one or more of at least a portion of an address field, a virtual local area network (VLAN) identifier, etc., and/or one or more other suitable fields of the header 102 (e.g. layer 3 header fields, layer 4 header fields, etc.).

The hash calculator 50 applies a selected hash function to the key 110 to generate a hash output value 118. The hash output value 118 is then used as an index into one of the tables 54 to select one entry from multiple entries in the corresponding table. The engine selector 210 provides the multipath group from the forwarding manager 202, which identifies which table (e.g., table 55 of FIG. 2B) of the tables 54 is to be used with the index. A table selector 212 selects the identified table based on the multipath group. A value stored in the selected entry in the identified table is then used to select an egress interface for transmitting the packet. As merely an illustrative example, if the group of network interfaces consists of four members, each member in the group is assigned a respective value of 0, 1, 2, or 3, and entries in the table 55 (FIG. 2B) have values selected from a set consisting of 0, 1, 2, or 3, according to an illustrative embodiment.

In some embodiments, the table 55 includes N entries, where N is a suitable positive integer. In some embodiments, values of entries in the table 55 have values selected from a set consisting of M values, where M is a positive integer corresponding to the number of egress interfaces in the group. In some embodiments, N is much greater than M. For example, in some embodiments, N is at least two times M. In some embodiments, N is at least four times M. In some embodiments, N is at least eight times M. In some embodiments, N is at least an order of magnitude larger than M.

In some embodiments, the multipath egress interface selector 204 is configured to perform a modulo-N operation on the hash output value 118, where the hash calculator 50 is configured to generate values in a range of 0 to P, and where P is a suitable positive integer greater than N. In some embodiments, the hash calculator 50 includes a modulo-N calculator (not shown in FIG. 2A). In some embodiments, the hash calculator 50 is configured to perform another suitable operation that suitably maps first values in the range 0 to P to second values in the range 0 to N. In another embodiment, the selected hash function used by the hash calculator is designed to generate a hash value 118 in a suitable range having N values.

Figure 2B:
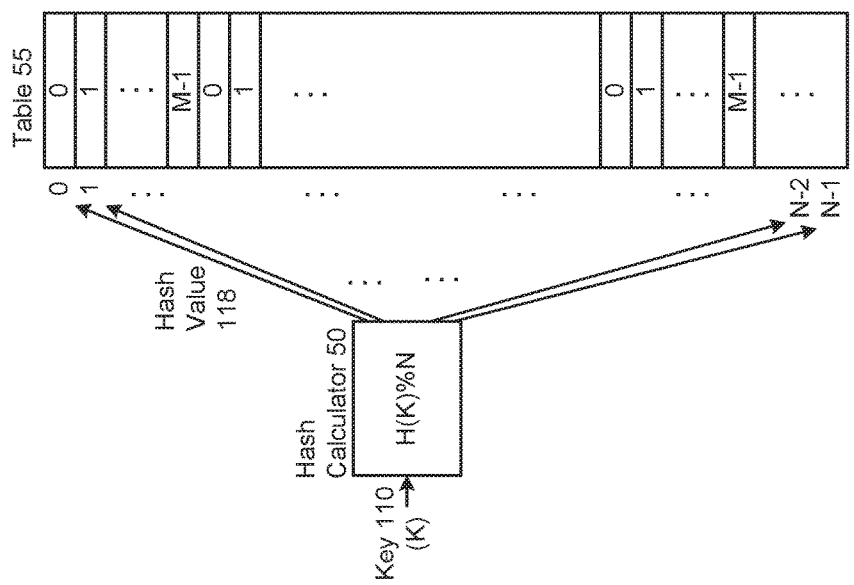
FIG. 2B is a diagram of an example forwarding table and hash calculator of FIG. 2A, according to an embodiment.

FIG. 2B is a diagram illustrating use of the hash value 118 as an index into the table 55, according to an embodiment. For example, in an embodiment, the forwarding manager 202 identifies a multipath group that corresponds to the table 55 for a received packet, where the table 55 stores identifiers for the egress ports of the identified multipath group. The hash calculator 50 generates a hash value 118 from the key 110 corresponding to the received packet so that the hash value 118 has a value from the set consisting of 0, 1, . . . , N−1. The hash value 118 is then used as an index into the table 55, which includes N entries. Each entry in the table 55 has a value from the set consisting of 0, 1, . . . , M−1, where M is the number of egress interfaces in the selected multipath group of egress interfaces. In the embodiment shown in FIG. 2B, the hash calculator 50 uses a function "H(K) modulo N" for generating a hash index in the range [0,N−1]. In other embodiments, other suitable functions are used to select an index of the table 55. In an embodiment, for example, the table 55 stores a value of "2" at the index corresponding to the hash value 118, which corresponds to port P2. In another embodiment, the value "2" corresponds to the second entry in a list of interfaces of the multipath group.

In some embodiments, the multipath egress interface selector 204 is configured to maintain multiple tables 54 for multiple groups of egress interfaces that are directly or indirectly coupled to a same network destination. For example, in an embodiment, the multipath egress interface selector 204 is configured to maintain first and second tables for first and second multipath groups, respectively, that correspond to a same network destination. In some embodiments, the plurality of tables 54 are stored in a single memory device. In other embodiments, the plurality of tables 54 are stored in multiple memory devices. In some embodiments, the multipath egress interface selector 204 is configured to use the same hash function for all of the multipath groups for a same network destination. In other embodiments, the multipath egress interface selector 204 is configured to use different hash functions, seed values, or offsets for different groups of egress interfaces, thus avoiding polarization of the selection (e.g., selection of a particular path to the exclusion of other paths in the multipath group) among different groups, for example.

The multipath egress interface selector 204 is configured to use first and second multipath groups that coexist with each other for forwarding packets after, or prior to, a change in path availability for the network destination. For example, for a first time period, the multipath egress interface selector 204 uses a first multipath group corresponding to the table 55 for a network destination. In an embodiment, the multipath egress interface selector 204 is configured to identify a change in path availability corresponding to the network destination. In various embodiments and/or scenarios, for example, the change in path availability corresponds to an increase in the number of available paths (e.g., a new server or other network device that corresponds to the network destination). After a change in path availability (e.g., a server or path failure or server or path addition) or prior to a change in path availability (e.g., a planned shutdown of a server or path, compaction of an ECMP group, starting a new server), the multipath egress interface selector 204 creates a second multipath group corresponding to the table 56 for the network destination. Instead of rehashing the table 55 to accommodate a new server or egress interface (which potentially results in unnecessary session termination and/or out of order packet delivery), the egress interface manager 58 creates a second table 56 that includes remaining paths of the first multipath group that remain available after the change in the path availability. In some scenarios, for example, adding a new path and/or recovering from a path failure, each of the paths of the first table 55 is a "remaining" path that is included in the second table 56. The second multipath group coexists with the first multipath group for a transition period, in an embodiment. After the transition period, for instance following a predetermined aging out time period or following a natural termination of existing communication sessions prior to creation of the second multipath group, or a combination thereof, the egress interface manager 58 removes the first multipath group. In an embodiment, the egress interface manager 58 creates the second multipath group to include the remaining paths of the first multipath group so that existing packet sessions or flows are not disrupted. In other words, existing packet sessions for the network destination are not prematurely terminated if the corresponding network path is still available.

Figure 3:
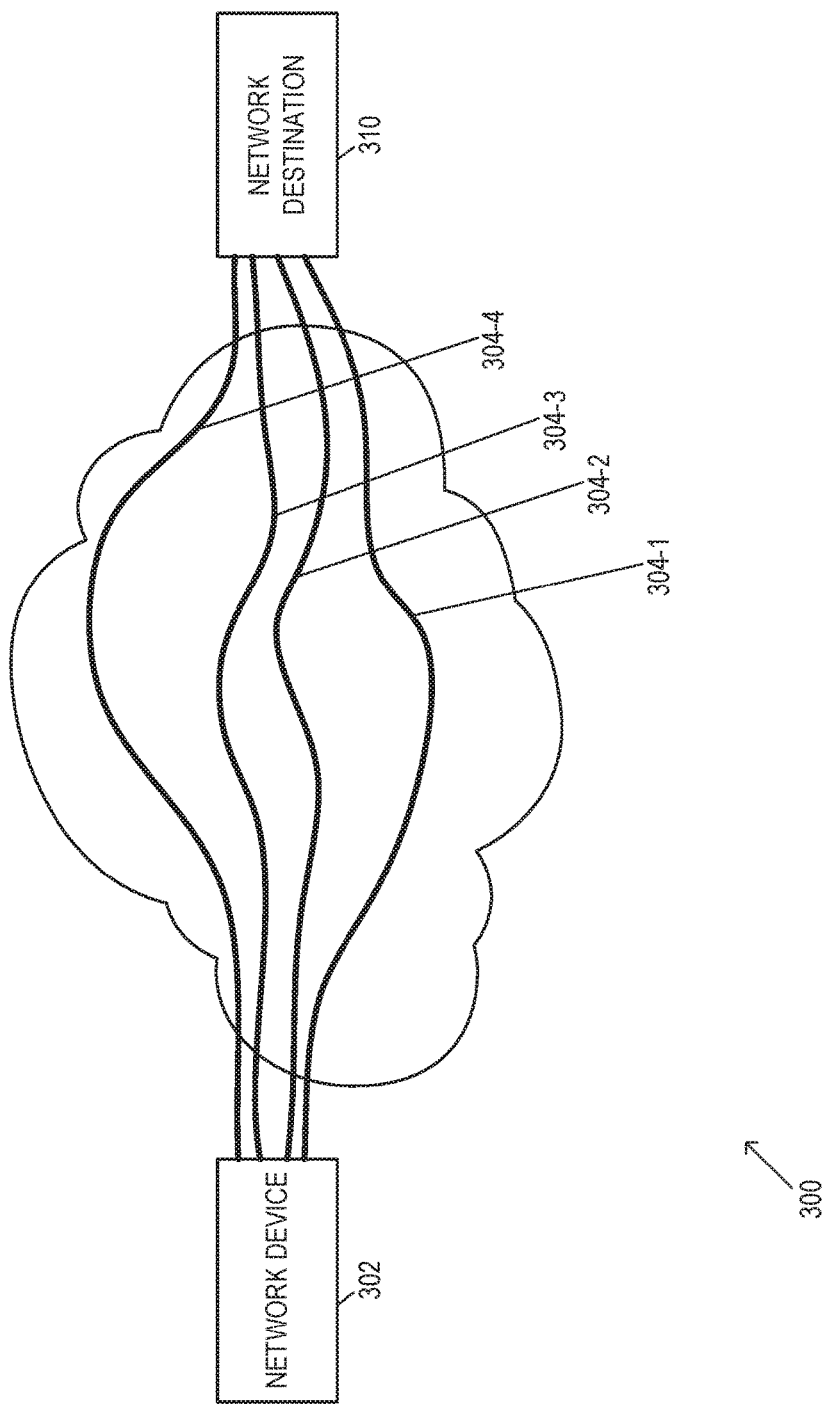
FIG. 3 is a diagram of an example network configuration for load balancing to a same network address, according to an embodiment.

FIG. 3 is a diagram of an example network configuration 300 for load balancing to a same network destination 310 (e.g., a server), according to an embodiment. The network configuration 300 includes a network device 302, a plurality of paths 304 to the network destination 310, and the network destination 310. Although four paths 304-1, 304-2, 304-3, and 304-4 are shown in the example of FIG. 3, the plurality of paths 304 includes two, three, five, or more paths in various other similar embodiments that for purposes of clarity are not depicted in the Figure. In the embodiment of FIG. 3, the network device 302 and the network destination 310 have an established packet session where packets flow from the network device 302 to the network destination 310 over the plurality of paths 304. In other words, each of the plurality of paths 304 can be used for transferring a packet from the network device 302 to the network destination 310. Moreover, any path of the plurality of paths 304 can be used as a substitute for another path of the plurality of paths 304 because the network destination is the same and thus any active sessions remain intact. In an embodiment, the network device 302 dynamically load balances packets to be sent to the network destination 310 across each of the plurality of paths. Dynamic load balancing rebalances active packet sessions across the plurality of paths 304, while maintaining packet order within active packet sessions. In this way, dynamic load balancing provides resiliency for a multipath group to a single destination.

Figure 4:
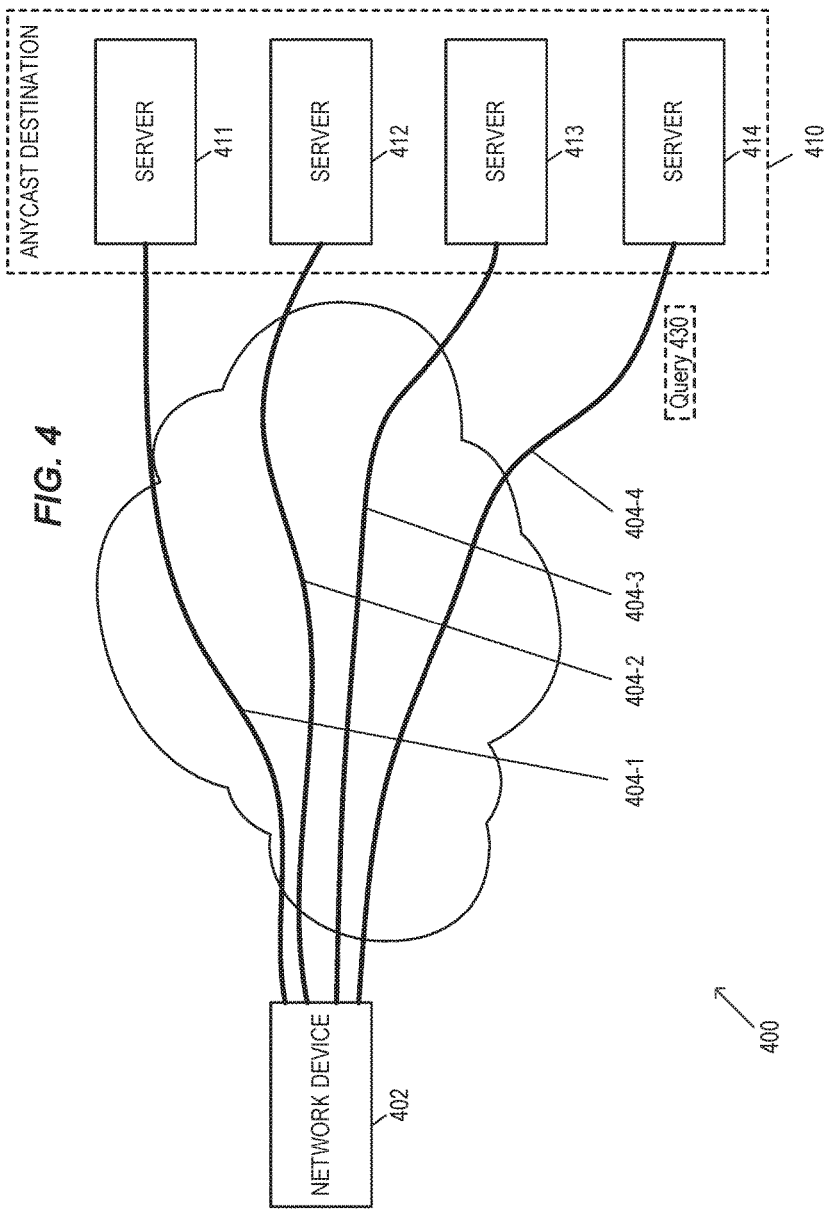
FIG. 4 is a diagram of an example network configuration for load balancing to an anycast destination, according to an embodiment.

FIG. 4 is a diagram of an example network configuration 400 for load balancing to an anycast destination 410 (e.g., a one-to-one-of-many association), according to an embodiment. The network configuration 400 includes a network device 402 (e.g., implemented by the network device 200), a plurality of paths 404 (e.g., egress interfaces) to the anycast destination 410, and the anycast destination 410. Although four paths 404-1, 404-2, 404-3, and 404-4 are shown in the example of FIG. 4, the plurality of paths 404 includes two, three, five, or more paths in other similar embodiments that are not depicted in the figure for purposes of clarity. The anycast destination 410 corresponds to multiple servers, for example, servers 411, 412, 413, and 414, each corresponding to a respective path of the plurality of paths 404, but not necessarily sharing a common geographical location. In an embodiment, for example, the servers 411, 412, 413, and 414 are located in different countries and requests from users in a particular country are forwarded to the corresponding server of the particular country. In some embodiments, the network device 402 creates a first table 55 for the anycast destination 410. In the embodiment shown in FIG. 4, the first table 55 has N entries corresponding to M paths, where M is equal to four (for servers 411, 412, 413, and 414).

In an embodiment, the anycast destination 410 corresponds to, for example, a web site that is hosted by the multiple servers or to caching servers in a Content Distribution Network (CDN). The network device 402 receives a query 430 for the web site (e.g., from a client device), selects one of the servers 411, 412, 413, or 414 corresponding to the web site, and forwards the query to the selected server. For example, the network device 402 sends the query 430 to the server 414 via the path 404-4 and, in an embodiment, the server 414 establishes a server side session for the web site with the client device. In this embodiment, a change from the path 404-4 would result in a change from the server 414, and thus the active packet session with the selected server could be disrupted because the servers 411, 412, and 413 may not have information about the server side session maintained by the server 414. In other words, the use of a substitute path from the multipath group does not maintain the active packet session for the anycast destination 410.

Figure 5:
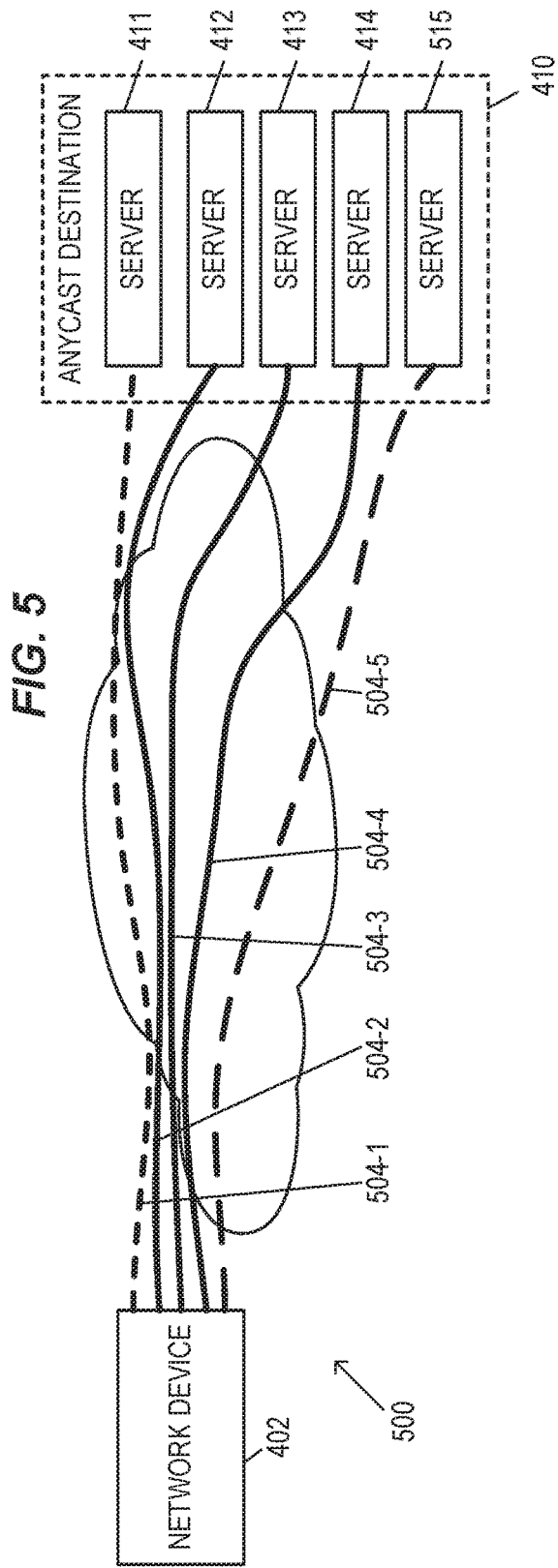
FIG. 5 is a diagram of an example network configuration for load balancing to an anycast destination after a change in path availability, according to an embodiment.

FIG. 5 is a diagram of an example network configuration 500 for load balancing to the anycast destination 410 after a change in path availability, according to an embodiment.

FIG. 6 is a diagram of an example timeline 600 for updating multipath groups based on the change in path availability, according to an embodiment. In some scenarios, the timeline 600 provides an improved transition between multipath groups on network topology change events (e.g., adding or removing paths) when a static load balancing scheme is used for a single destination, for example, when a session to the single destination is assigned a specific path for the entire duration of the session. In other embodiments, a single destination that has been assigned a specific path for a session replaces the anycast destination.

The network configuration 500 includes the network device 402, a plurality of paths 504 to the anycast destination 410, and the anycast destination 410. In the scenario of FIG. 5A, the anycast destination 410 includes the servers 411, 412, 413, and 414, and also an additional server 515 with a corresponding egress interface associated with the anycast destination 410. In other words, the change in path availability is an increase in the number of available paths and/or servers for a multipath group corresponding to the anycast destination 410. Accordingly, the plurality of paths 504 includes a path 504-5 to the additional server 515 and also remaining paths 504-1, 504-2, 504-3, and 504-4 corresponding to the servers 411, 412, 413, and 414.

The timeline 600 generally includes five periods: an initial period, before the change in path availability, up to a time T0; a first transition period from the time T0 to a time T1, a second transition period from the time T1 to a time T2, a third transition period from the time T2 to a time T3, and a final period after the time T3. During the initial period, a set of active packet sessions 610 from various network devices (not shown) are load balanced by the network device 402 across a first multipath group G0 that corresponds to the anycast destination 410, in an embodiment. The initial period generally corresponds to the configuration 400 and thus the multipath group G0 includes the paths 404-1, 404-2, 404-3, and 404-4. The network device 402 creates a first forwarding table, for example, forwarding table 55, identified by the first multipath group G0 where elements in the table 55 indicate individual egress interfaces (e.g., one of paths 404-1, 404-2, 404-3, and 404-4) in the first multipath group G0. In an embodiment, the first multipath group G0 is stored in the default forwarding engine 52-1, but not in the policy-based forwarding engine 52-2, and thus the engine selector 210 selects the first multipath group G0 (corresponding to table 55) for packets intended for the anycast destination 410.

At the time T0, the network device 402 identifies a change in path availability or network topology for the anycast destination 410, for instance due to failure of an existing network path or addition of a network path, and begins a recovery process for the anycast destination 410. In an embodiment, the network device 402 receives a network management message that indicates the change in path availability. In other embodiments, the network device 402 determines that path availability has changed based on an indication of packet loss that exceeds a threshold, an indication of network latency that exceeds a threshold, or other suitable indication.

In response to the change in path availability (e.g., the identification of the change at T0), the network device 402 creates a second table 56, such as a second forwarding table, associated with a second multipath group G1 corresponding to the anycast destination 410. Elements in the second table 56 include values indicating individual egress interfaces in the second multipath group G1. In an embodiment, the first multipath group G0 and the second multipath group G1 coexist with each other. In other words, the network device 402 simultaneously utilizes multiple forwarding tables for forwarding packets to the anycast destination 410, in an embodiment. In an embodiment, the network device 402 creates the second multipath group to include remaining paths of the first multipath group that remain available after the change in the path availability and any added paths. In other words, the network device 402 uses the first table to make forwarding decisions for active sessions 610 (legacy sessions established before T0) and creates the second table to make forwarding decisions for new sessions 620 (established after T0). In an embodiment, the network device 402 uses the policy-based forwarding engine 52-2 for forwarding new sessions to the second multipath group G1 and uses the default forwarding engine 52-1 for forwarding active sessions to the first multipath group G0. In the embodiment shown in FIG. 5A, the remaining paths are paths 504-1, 504-2, 504-3, and 504-4, which correspond to the servers 411, 412, 413, and 414, while the added path 504-5 is also included. In other words, the second forwarding table includes every path of the first forwarding table, in an embodiment. In another embodiment, the change in path availability includes a removed path, for example, a removal of the server 411 and path 404-1. In this embodiment, the remaining paths are paths 504-2, 504-3, and 504-4. In other embodiments, the change in path availability includes both an additional path and a removed path.

The remaining paths support at least some active packet sessions 610 after the change in the path availability, in some scenarios. In an embodiment, the network device 402 simultaneously uses the first multipath group G0 and the second multipath group G1 to allow at least some active packet sessions 610 to terminate "naturally," for example, as opposed to removing the first multipath group G0 and immediately using the second multipath group G. A session will terminate naturally when a user logs out of a web site, cancels a session, closes a browser window, or finishes a query associated with a packet session, for example. In some scenarios, a user's perceived experience with the packet session and the anycast destination 410 is minimally disrupted, if at all, by allowing the active/legacy sessions 610 to be forwarded using the first table 55, despite the creation of the new, second multipath group, until they terminate naturally.

In various embodiments, the network device 402 identifies whether a packet is part of a previously active session or is part of a new session, and then selects the first multipath group G0 and the first table 55 for forwarding a packet when the packet is from the active packet sessions 610 and selects the second multipath group G1 and the second table for forwarding the packet when the packet is from new packet sessions 575 that are established after the change in the path availability at T1. In an embodiment, the network device 402 identifies a new session based on the frame type of the packet (e.g., a Syn or Syn-Ack frame type of the Transmission Control Protocol). In some embodiments, the network device 402 identifies a new session based on analysis of whether one or more packet attributes (e.g., source, destination, packet type, quality of service) of the packet correspond to attributes of a previously established session. The network device selects an element in the selected table to identify an individual egress interface for forwarding the packet to the network destination and transfers the packet to an egress interface in the selected group indicated by the value in the selected element of the selected table.

At T1, traffic forwarded to the anycast destination 410 via the first multipath group G0 is reduced relative to T0, for example, due to natural termination of active sessions 610. The network device 402 begins the second transition period after a preselected time interval (e.g., an age-out period), for example, ten seconds, one minute, or another suitable time interval, in an embodiment. In another embodiment, the network device 402 monitors packet activity of the active packet sessions 610 to identify the time T1 at which the first transition period should be ended. For example, the network device 402 monitors an amount of traffic through the first multipath group G0 (e.g., number of packets, quantity of data, number of sessions, etc.) and ends the first transition period when the amount of traffic reaches a threshold of low activity.

The network device 402 monitors packet activity for the first multipath group G0 and moves the active sessions 610 established before T0 from being forwarded using the default forwarding engine 52-1 to being forwarded using custom rules of the policy-based forwarding engine 52-2 during the second transition period, in an embodiment. In some embodiments, the policy-based forwarding engine 52-2 has a limit to a number of rules that can be executed. In an embodiment, the network device 402 monitors the number of packets forwarded by an individual rule and removes the rule when traffic forwarded by the rule has met an idle threshold. For example, in an embodiment where the forwarding engine 52-2 supports up to 100 rules that can be used for the first multipath group G0 but the first multipath group G0 has 150 active sessions, the network device 402 maintains 50 active sessions within the default forwarding engine 52-1, moves 100 active sessions to the policy-based forwarding engine 52-2, and monitors the 100 active sessions for natural termination, after which the remaining 50 active sessions are moved to the policy-based forwarding engine 52-2.

At T2, traffic forwarded to the anycast destination 410 via the first multipath group G0 is reduced to zero, for example, due to natural termination of active sessions 610 and the moving of active sessions to custom rules of the policy-based forwarding engine 52-2. After T2, the network device 402 updates the default forwarding engine 52-1 to use the second multipath group G1, in an embodiment, and thus the new sessions 620 established after T0 are forwarded via the default forwarding engine 52-1. In other words, the network device 402 removes or disables the first multipath group G0 from the default forwarding engine 52-1 and uses the second multipath group G1 for the anycast destination 410 (e.g., packets directed to the anycast destination are forwarded via egress interfaces that are members of the second multipath group G1). At T3, the custom rules of the policy-based forwarding engine 52-2 for the active sessions are removed after natural termination, in an embodiment.

FIG. 7 is a flow diagram of an example method 700 for updating multipath groups of a network device, according to an embodiment. The network device 200 of FIG. 2A, or the network device 402 of FIG. 4, is configured to implement the method 700, according to an embodiment. In other embodiments, however, the method 700 is implemented by another suitable network device. Similarly, in other embodiments, the network device 200 of FIG. 2A is configured to implement a suitable method different than the method 700.

At block 702, the network device 200 creates a first table defining a first multipath group of multiple egress interfaces, in an embodiment. The first table is a forwarding table for forwarding packets to members of a first multipath group. Elements in the first table include values indicating individual egress interfaces that are members of the first multipath group. In an embodiment, the first multipath group corresponds to the multipath group G0 and the first table corresponds to the table 55 described above with respect to FIGS. 2A and 6.

At block 704, the network device identifies a change in network path availability at one or more egress interface members of the first multipath group, in an embodiment. The first multipath group includes at least some egress interfaces that remain available for network communication after the change in the network path availability and that support at least some active packet sessions via the remaining network paths that remain after the change in the network path availability. In an embodiment, the change in path availability of the first multipath group is an added path, the second multipath group includes the added path, and the first multipath group does not include the added path.

At block 706, in response to the change in the network path availability, the network device 200 creates a second table defining a second multipath group of multiple egress interfaces, in an embodiment. In an embodiment, elements in the second table include values indicating individual egress interfaces that are members of the second multipath group, the second multipath group coexists with the first multipath group, and the second multipath group includes the remaining network paths of the first multipath group that remain available for network communication after the change in the network path availability. In an embodiment, some network paths are members both of the first multipath group as well as the second multipath group.

At block 708, the network device 200 selects the first multipath group and the first table for forwarding a packet when the packet is from the active packet sessions that were active before the change in the network path availability and the second multipath group and the second table for forwarding the packet when the packet is from new packet sessions that are established after the change in the path availability.

At block 710, the network device 200 selects an element in the selected table to identify an individual egress interface for forwarding the packet to a network destination, according to an embodiment. For example, in an embodiment, the multipath egress interface selector, described above with respect to FIG. 2A, selects the table 55 or 56 based on the header 102 of the packet. In an embodiment, the network device 200 calculates a hash value using header information of the packet, as described above with respect to FIG. 2A, and uses the hash value as an index into the selected table to identify an egress interface for the packet. In an embodiment, the network device 200 uses a same hash function for the first table and the second table.

At block 712, the network device 200 transfers the packet to an egress interface in the selected group indicated by a value in the selected element of the selected table for transmission by the egress interface in the selected group indicated by the value in the selected element of the selected table.

In some embodiments, various blocks of the method 700 are performed by different components of the network device 200. In an embodiment, for example, blocks 702, 704, and 706 are performed by a control plane processor (not shown), while blocks 708, 710, and 712 are performed by a data plane processor (not shown). In an embodiment, the control plane processor includes the egress interface manager 58 and the data plane processor includes the multipath egress interface selector 204. In other words, the egress interface manager 58 and the multipath egress interface selector 204 are implemented by separate processors or integrated circuits. In another embodiment, the egress interface manager 58 and the multipath egress interface selector 204 are implemented by a same processor or integrated circuit.

FIG. 8 is a diagram of an example timeline 800 for updating multipath groups based on a change in path availability, according to another embodiment. The timeline 800 is similar to the timeline 600, but the network device 402 simultaneously creates custom rules for both active sessions and for new sessions. In other words, the network device 402 combines the first transition period with the second transition period of the timeline 600 and attempts to forward all sessions via custom rules during the first transition period.

The timeline 800 generally includes four periods: an initial period, before the change in path availability, up to a time T0; a first transition period from the time T0 to a time T1, a second transition period from the time T1 to a time T2, and a final period after the time T2. The initial period during the timeline 800 generally corresponds to the initial period of the timeline 600, where a set of active packet sessions are load balanced by the network device 402 across a first multipath group G0 that corresponds to the anycast destination 410, in an embodiment.

At the time T0, the network device 402 identifies a change in path availability or network topology for the anycast destination 410. In an embodiment, in response to the change in path availability, the network device 402 creates custom rules in the policy-based forwarding engine 52-2 for packets that are directed to the anycast destination 410. The network device 402 creates the custom rules during the first transition period and ends the first transition period when the amount of traffic to the first multipath group G0 reaches a threshold of low activity, in an embodiment. The threshold for ending the first transition period of the timeline 800 is less than the threshold for ending the first transition period of the timeline 600, in an embodiment.

After T1 during the second transition period, the network device 402 updates the default forwarding engine 52-1 to use the second multipath group G1, in an embodiment, and thus the new sessions established after T1 are forwarded via the default forwarding engine 52-1. In an embodiment, active sessions established before T1 that have not been moved to the policy-based forwarding engine 52-2 are dropped or discarded, sessions established before T1 that have been moved to the policy-based forwarding engine 52-2 are forwarded using the custom rules, and sessions established after T1 are forwarded using the default forwarding engine 52-1.

After T3 during the final period, traffic forwarded to the anycast destination 410 via the custom rules for the first multipath group G0 is reduced to zero, for example, due to natural termination of active sessions 610 and all sessions established after T0 are forwarded using the default forwarding engine 52-1.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for updating multipath groups of a network device, comprising:
   creating, at the network device, a first table defining a first multipath group of multiple egress interfaces, wherein elements in the first table include values indicating individual egress interfaces that are members of the first multipath group;
   identifying, at the network device, a change in network path availability at one or more egress interface members of the first multipath group, the first multipath group including at least some egress interfaces that remain available for network communication after the change in the network path availability and that support at least some active packet sessions via the remaining network paths after the change in the network path availability;
   creating, at the network device and in response to the change in the network path availability, a second table defining a second multipath group of multiple egress interfaces, wherein i) elements in the second table include values indicating individual egress interfaces that are members of the second multipath group, ii) the second multipath group coexists with the first multipath group, and iii) the second multipath group includes the remaining network paths of the first multipath group that remain available after the change in the network path availability; and
   selecting, at the network device, the first multipath group and the first table for forwarding a packet when the packet is from the active packet sessions and the second multipath group and the second table for forwarding the packet when the packet is from new packet sessions that are established after the change in the path availability.

2. The method of claim 1, wherein the method further comprises:
   selecting, at the network device, an element in the selected table to identify an individual egress interface for forwarding the packet to a network destination;
   transferring the packet to an egress interface in the selected multipath group indicated by a value in the selected element of the selected table for transmission by the egress interface in the selected multipath group indicated by the value in the selected element of the selected table.

3. The method of claim 2, wherein selecting the element in the selected table comprises:
   calculating a hash value using header information of the packet; and
   using the hash value as an index to an element in the selected table.

4. The method of claim 3, wherein calculating the hash value comprises using a same hash function for the first table and for the second table.

5. The method of claim 2, wherein:
the network destination is an anycast destination that corresponds to a one-to-one-of-many association of servers where packets are forwarded to any single server of a group of potential servers that are all identified by the anycast address;
the active packet sessions are directed to respective servers of the group of potential servers; and
the new packet sessions are directed to the anycast destination.

6. The method of claim 1, wherein:
the change in network path availability of the first multipath group is an added network path;
the second multipath group includes the added path; and
the first multipath group does not include the added path.

7. The method of claim 6, wherein the second multipath group includes every path of the first multipath group.

8. The method of claim 1, the method further comprising removing, at the network device, the first multipath group from a default forwarding engine after a transition period.

9. The method of claim 8, the method further comprising:
monitoring, at the network device, the active packet sessions supported by the first multipath group for packet activity after creating the second table; and
wherein removing the first multipath group comprises removing the first multipath group when the active packet sessions meet an idle threshold of packet reception.

10. The method of claim 8, the method further comprising creating, at the network device, respective routing rules in a policy-based forwarding engine for ones of the active packet sessions that remain active after the transition period.

11. The method of claim 10, wherein selecting the first multipath group and the first table for forwarding the packet when the packet is from the active packet sessions and the second multipath group and the second table for forwarding the packet when the packet is from new packet sessions that are established after the change in the path availability comprises selecting between the default forwarding engine and the policy-based forwarding engine for the selected multipath group.

12. The network device of claim 10, wherein the forwarding manager is configured to select between the default forwarding engine and the policy-based forwarding engine for the selected multipath group.

13. A network device, comprising:
a plurality of egress interfaces configured to transmit packets;
a forwarding manager configured to select one or more multipath groups of multiple egress interfaces for forwarding packets received by the network device, and
a multipath egress interface selector configured to select individual egress interfaces within the one or more multipath groups selected by the forwarding manager,
wherein the multipath egress interface selector is configured to
create a first table defining a first multipath group of multiple egress interfaces, wherein elements in the first table include values indicating individual egress interfaces that are members of the first multipath group,
identify a change in network path availability at one or more egress interface members of the first multipath group, the first multipath group including at least some egress interfaces that remain available for network communication after the change in the network path availability and that support at least some active packet sessions via the remaining network paths after the change in the network path availability,
create, in response to the change in the network path availability, a second table defining a second multipath group of multiple egress interfaces, wherein i) elements in the second table include values indicating individual egress interfaces that are members of the second multipath group, ii) the second multipath group coexists with the first multipath group, and iii) the second multipath group includes the remaining network paths of the first multipath group that remain available after the change in the network path availability,
select the first multipath group and the first table for forwarding a packet when the packet is from the active packet sessions and the second multipath group and the second table for forwarding the packet when the packet is from new packet sessions that are established after the change in the path availability.

14. The network device of claim 13, wherein the multipath egress interface selector is further configured to:
select an element in the selected table to identify an individual egress interface for forwarding the packet to a network destination; and
transfer the packet to an egress interface in the selected multipath group indicated by a value in the selected element of the selected table for transmission by the egress interface in the selected multipath group indicated by the value in the selected element of the selected table.

15. The network device of claim 14, wherein the multipath egress interface selector is further configured to:
calculate a hash value using header information of the packet; and
use the hash value as an index to an element in the selected table.

16. The network device of claim 14, wherein the multipath egress interface selector is further configured to use a same hash function for the first table and for the second table.

17. The network device of claim 13, wherein:
the change in network path availability of the first multipath group is an added network path;
the second multipath group includes the added path; and
the first multipath group does not include the added path.

18. The network device of claim 13, wherein:
the network destination is an anycast destination that corresponds to a one-to-one-of-many association of servers where packets are forwarded to any single server of a group of potential servers that are all identified by the anycast address;
the active packet sessions are directed to respective servers of the group of potential servers; and
the new packet sessions are directed to the anycast destination.

19. The network device of claim 13, wherein the multipath egress interface selector is further configured to remove the first multipath group from a default forwarding engine of the forwarding manager after a transition period.

20. The network device of claim 19, wherein the multipath egress interface selector is further configured to:
monitor the active packet sessions supported by the first multipath group for packet activity after creating the second table; and
remove the first multipath group when the active packet sessions meet an idle threshold of packet reception.

21. The network device of claim 19, wherein the multi-path egress interface selector is further configured to create respective routing rules in a policy-based forwarding engine of the forwarding manager for ones of the active packet sessions that remain active after the transition period.

\* \* \* \* \*